No. 766,979. PATENTED AUG. 9, 1904.
S. B. TURNER.
MECHANICAL MUSIC CHART.
APPLICATION FILED JULY 6, 1903.
NO MODEL. 3 SHEETS—SHEET 1.

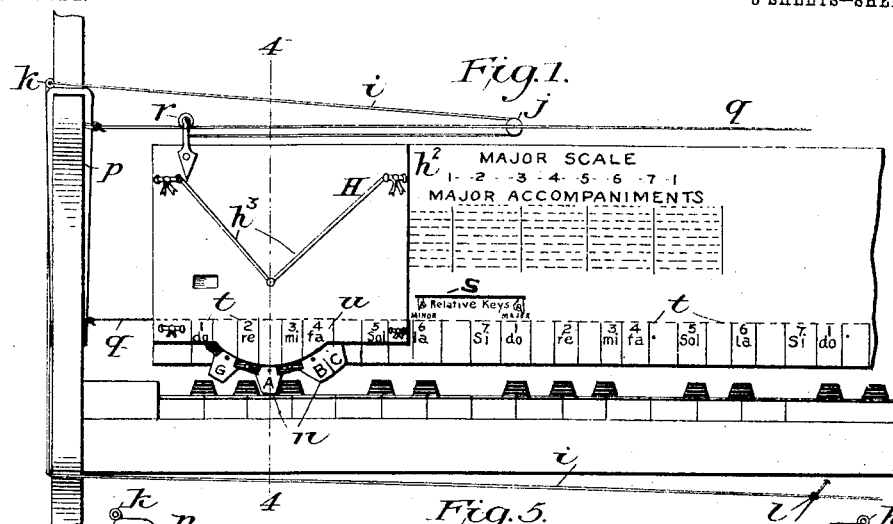

Fig. 1.

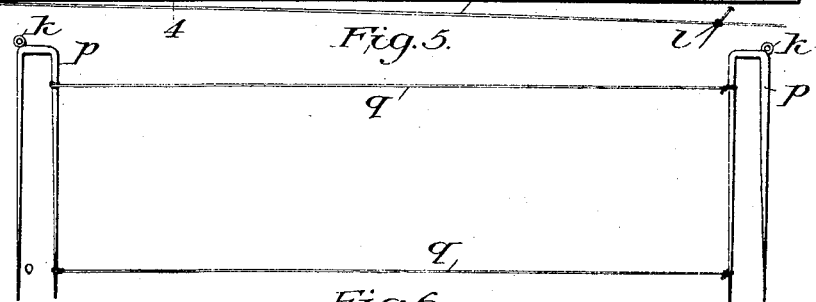

Fig. 5.

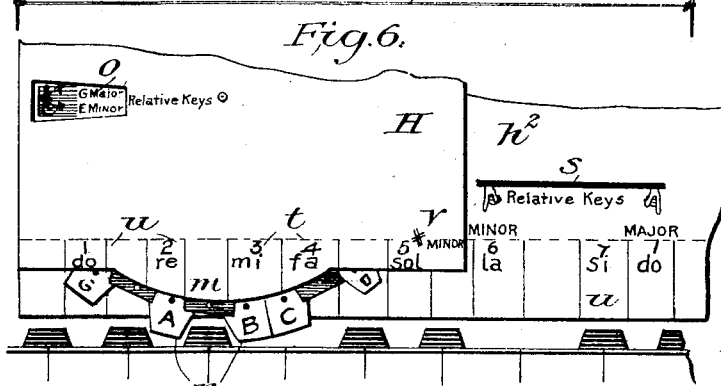

Fig. 6.

Fig. 8. MINOR SCALE
6--7--1--2--3--4--5*--6
MINOR ACCOMPANIMENTS

| | Lower Position | Central Position | Higher Position | Compound Chords |
|---|---|---|---|---|
| Tonic Chords | 56 61 l3 35 | 56 l1 32 65 | 50 31 63 l5 | 56 l6 61 l3 35 |
| Dominant " | l3 5* 72 3 | l3 7 32 5* | l3 3 5½ 7 | 3 3 5* 72 3 |
| Subdominant " | 22 6 23 4 | 22 2 43 6 | 22 4 62 2 | 2 2 6 23 4 |
| Sixth " | 3l 6 32 6 | 3l 6 32 6 | 3l 3 62 3 | l1 6 32 6 |
| Tonic 6/4 " | 56 6 23 4 | 6 2 43 6 | 6 4 62 2 | 6 6 6 23 4 |
| Dominant 6/4 " | l3 6 l3 3 | l3 1 32 6 | l3 3 63 1 | 3 3 6 l3 3 |
| Dominant 7th " | 53 5* 72 24 3 | 3 3 7 22 33 5* | 3 3 3 5½ 73 2 | 3 3 5* 72 24 3 |
| Tonic " | 6 6 l 3 | 6 6 l 3 6 | 6 6 3 6 1 | 6 6 6 l 3 |

Witnesses: Inventor:
L. T. Schaefer Samuel B. Turner
Mary E. Ryan

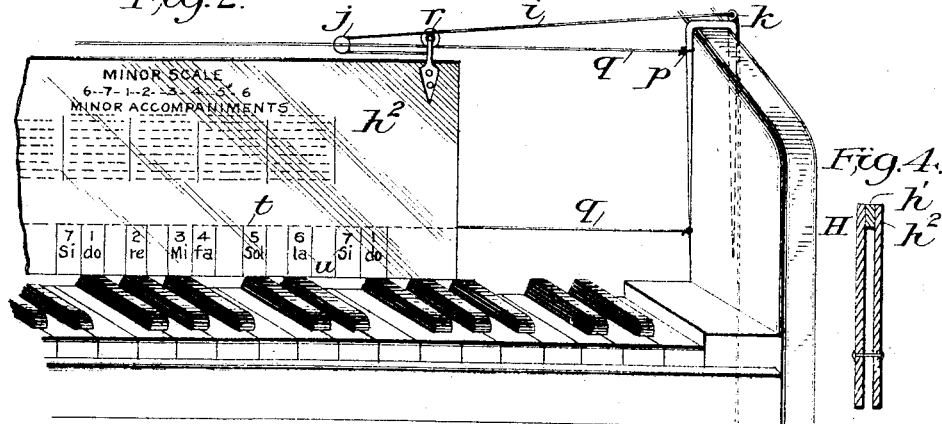
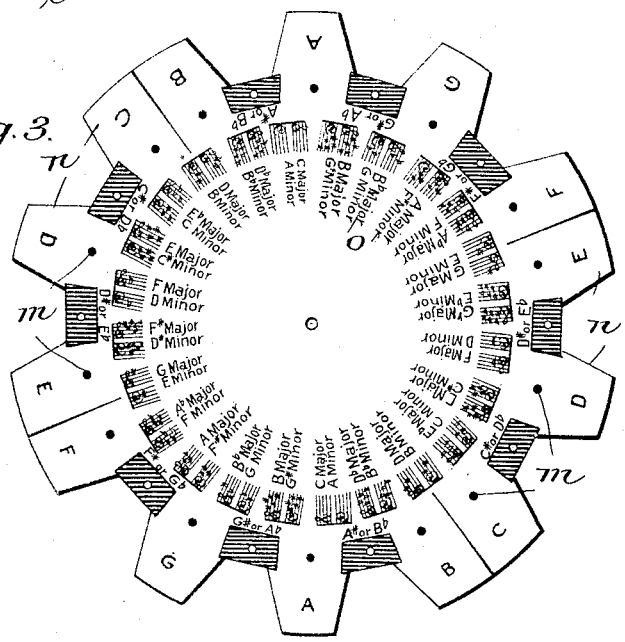

No. 766,979.

Patented August 9, 1904.

UNITED STATES PATENT OFFICE.

SAMUEL B. TURNER, OF CHICAGO, ILLINOIS.

MECHANICAL MUSIC-CHART.

SPECIFICATION forming part of Letters Patent No. 766,979, dated August 9, 1904.

Application filed July 6, 1903. Serial No. 165,008. (No model.)

*To all whom it may concern:*

Be it known that I, SAMUEL B. TURNER, a citizen of the United States, residing at Chicago, in the county of Cook and State of Illinois, have invented certain new and useful Improvements in Mechanical Music-Charts, of which the following is a specification.

This invention relates to improvements in a mechanical music-chart; and it consists in certain peculiarities of the construction of the various parts thereof, as will be hereinafter more fully set forth and specifically claimed.

The principal objects of my invention are, first, to provide a mechanical music-chart for students and teachers of vocal and instrumental music which shall be simple in construction and operation, being usually arranged, designed, and intended to be used with a piano, organ, or similar instrument, but may be constructed and may be used otherwise; second, to provide such a device as will illustrate the diatonic scale in all the major and minor keys used in practical music, and, third, will show the relation between major and minor music, with the principal chords of each, as commonly employed in piano and organ accompaniments, and illustrate the circle of fifths.

Other objects and advantages of my invention will appear in the description hereinafter contained.

In order to enable others skilled in the art to which my invention pertains to make use of the same, I will now proceed to describe it, referring to the accompanying drawings, in which—

Figure 9:
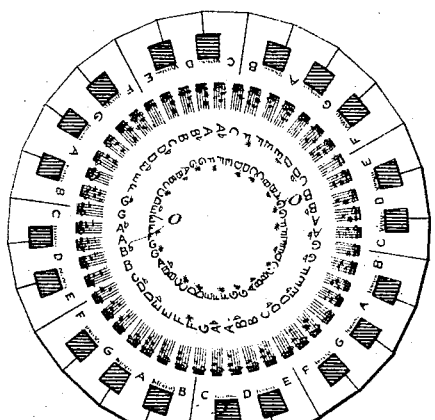
Figure 10:
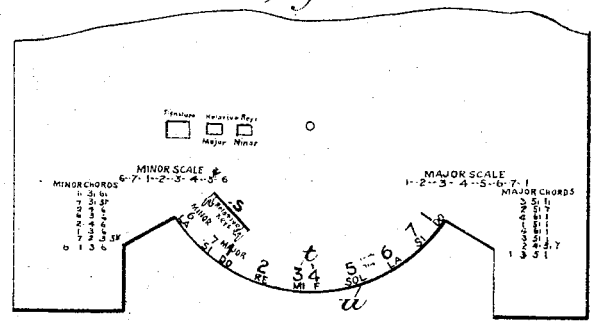
Figure 11:
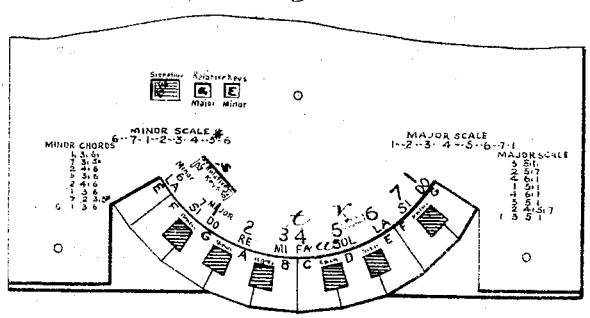

Figures 1 to 11, inclusive, illustrate different parts of the device, as follows: Figs. 1 and 2 represent the device as commonly used with a piano or organ. Fig. 3 represents one form of the signature-wheel. Fig. 4 is a cross-sectional view taken on line 4 4 of Fig. 1. Fig. 5 is a detached view of that part of the device that is used for holding the movable part of the device in position, as shown in Figs. 1 and 2. Fig. 6 is an enlarged front view illustrating the operation of the signature-wheel. Fig. 7 represents the diatonic major scale and also major chords and accompaniments. Fig. 8 represents the relative harmonic minor scale and also the corresponding chords and accompaniments in minor. Fig. 9 shows a four-octave signature-wheel. Fig. 10 represents a body or supporting-piece to be used in connection with Fig. 9; and Fig. 11 shows how Figs. 9 and 10, when movably connected with each other, may be used to illustrate musical tones, scales, or chords, as hereinafter explained.

Figs. 1 and 2 are views in front elevation of the mechanical music-chart as used with a piano, organ, or similar instrument, showing the device ready for use in the key of G♭ major and also the corresponding relative key of E♭ minor, also showing how the device may be used in modulating without raising the hands from the keyboard. This is done by means of two strings $i$, the strings being fastened to the movable transposer or sliding piece and thence carried to the right and left over hooks or pulleys $j$, and thence reversed and carried through loops $k$ or otherwise over the sides of the instrument and under the keyboard and fastened to the clothing of the performer, preferably to the knee, by means of a pin $l$ or otherwise, or the hooks or pulleys may be omitted and the strings carried directly over the sides of the keyboard, to the right and left, in which case the action of the device would be reversed, or the movable transposer may be placed on the keyboard of the instrument and used without the strings or without that part of the device illustrated in Fig. 5.

Fig. 3 is an enlarged detached front view of the signature-wheel, showing one arrangement of the signatures, words, and characters thereon and also showing a series of perforations or marks $m$, chromatically arranged, to illustrate the circle or progression of fifths in the formation of scales, as hereinafter described. The signature-wheel usually consists of a circular piece of soft cardboard or other suitable material having cog-like projections $n$ arranged so as to correspond with the keyboard and engage the black or raised keys of the piano or organ, the wheel having thereon signatures or marks of transposition with one or more clefs, the signature desired in the different transpositions being visible through a sight-opening. It may also show letters, words, or characters of explanation $o$ and should be placed between the movable transposer and a piece of cardboard or other suitable material having one or more sight-openings, which may have thereon staffs, clefs, words, letters, or characters to register with the signatures, words, letters, or characters that may be placed on the signature-wheel.

Fig. 4 is a cross-sectional view, taken on line 4 4 of Fig. 1, showing the detailed construction of the device.

Fig. 5 is a detached view of that part of the device which is used for holding the movable transposer or sliding piece in position. It consists of two staple or hook shaped pieces of metal or other suitable material $p$, which may be covered with soft material to prevent scratching or marring the instrument, the staple or hook shaped pieces being connected with one or more strings or cords $q$, preferably of india-rubber, which support the movable transposer by means of hooks or pulleys $r$, thus making it easy to adjust the device at such angle as will best accommodate the eye of the performer and not come in contact with the stops of the organ, the device being suspended slightly above the keyboard to prevent rattling by not coming in direct contact with the keys, with the exception of the cog-like projections of the signature-wheel.

Fig. 6 is an enlarged front view showing a portion of the device as used in the key of G major and E minor, also showing part of an enlarged three-octave signature-wheel, the double indicator $s$ always pointing to the keys of the piano or organ representing the tonic or first degree, both major and minor, in the different transpositions and corresponding with the signature, as shown through the sight-opening.

Figs. 7 and 8 represent the diatonic major and minor scales and also major and minor chords and accompaniments in the different positions, with smaller numerals to denote the fingering. The larger numerals in both Figs. 7 and 8 correspond with the degrees of the diatonic major scale. Fig. 7 shows the diatonic major scale and also major chords and accompaniments, while Fig. 8 likewise shows the relative harmonic minor scale and also the corresponding chords and accompaniments in minor. Both major and minor scales, chords, and accompaniments may be represented in all the keys by adjusting the movable transposer to correspond with the key desired, in which case the keys to be used will be found on the piano or organ directly under the numerals $t$, located on the front part of the device, thus showing what keys correspond with the horizontal rows of characters shown in Figs. 7 and 8 of the drawings and exhibiting scales and combinations of chords and showing in the different positions with easy fingering the principal major and minor chords used in accompanying.

Fig. 9 shows a four-octave signature-wheel without the cog-like projections, the wheel having thereon a representation of the whole or a part of the keyboard of a piano or organ. This wheel may be used either with or without the signatures, and when used in combination with a body or supporting-piece, as shown in Fig. 10, will illustrate scales, chords, accompaniments, and transpositions without the piano or organ, as shown in Fig. 11.

Similar characters and letters of reference refer to like parts throughout the different views of the drawings.

H represents the body or supporting-piece, which in size should correspond with a signature-wheel having thereon a representation of one or more octaves of the keyboard of a piano or organ. This body or supporting-piece may be either circular or rectangular in outlines, and it usually consists of two (sometimes three) pieces of cardboard or other suitable material H, $h'$, and $h^2$, laced or otherwise fastened together in such manner as to leave a space between for the operation of the signature-wheel. When laced together, I use one or more strings or ribbons, which for artistic effect may be of different colors, the signature-wheel being first placed in position, when the ribbon, doubled or otherwise, is passed through the body or supporting-piece and the axis of the wheel and thence through perforations and securely tied, as shown at $h^3$ in Fig. 1. This will allow the wheel to revolve freely and lessen the probability of scratching or marring the piano or organ, as might be the case if a metal pin were used for the axis, this body or supporting-piece, when used to register with the keyboard of a piano or organ, constituting the movable transposer, its front surface having thereon a double indicator $s$ and characters $t$ or syllables $u$, or both, each representing the diatonic major scale, the fifth being sharped $v$ or otherwise, thus making the same characters or syllables correspond with and represent both the diatonic major scale and its relative minor in all the different transpositions. The transposer may likewise show words and characters representing scales, chords, and accompaniments, as illustrated in Figs. 1 and 2 of the drawings, said illustrations being enlarged in Figs. 7 and 8 of the drawings.

While I have shown the mechanical music-chart as used with a five-octave instrument, yet I do not desire to limit myself to such arrangement, as I may construct and arrange it for a larger or smaller number of octaves, or omit the signature-wheel, or arrange the body or supporting-piece in such manner as to exhibit a larger section of that part of the signature-wheel representing the keyboard, when by continuing the circular or curved line of characters or syllables on the body or supporting-piece an increased register will be obtained, or I may add to, omit, or change syllables, letters, words, or characters, or place the signatures on the body or supporting-piece in such manner that the signature desired will be visible through a sight-opening in the signature-wheel, thus inverting these parts without departing from the spirit of my invention.

In using my mechanical music-chart I place it in an upright position over the keyboard of the piano, organ, or similar instrument at such angle as will make the words, letters, and characters on its front surface plainly visible, and with the cog-like projections of the signature-wheel geared with the corresponding keys of the instrument and with the double indicator pointing to the keys of the instrument corresponding with the tonic or first degree of both the major scale and its relative minor in the key desired. When it is desired to play or accompany a piece of music written in the key of G♭ major or its relative E♭ minor, the device is slid to the right or left by means of the strings or otherwise until the double indicator points to the keys of the instrument corresponding therewith, when the black or raised keys of the piano or organ by reason of their being in gear with the cog-like projections of the signature-wheel will cause the wheel to revolve in such manner that the sight-opening in the body or supporting-piece will show the signature of G♭ major and its relative E♭ minor. When it is desired to play in the key of G major or E minor, the device is slid toward the right or treble until the double indicator points to the keys of the instrument corresponding therewith, the signature-wheel being caused to turn slightly, when the signature of G major and its relative E minor will be visible through the sight-opening, thus transposing what was previously shown in the relative keys of G♭ major and E♭ minor into the relative keys of G major and E minor. From the foregoing it is evident that the remaining keys may be effected and transposed in like manner, the characters, syllables, words, and signatures in all cases adjusting automatically, so as to correspond with the requirements of the key desired.

When illustrating the circle of fifths, I hold the mechanical music-chart with the left hand and with the right hand I insert a pin or other pointed instrument in that part of the signature-wheel (illustrated in Fig. 6 of the drawings) showing a chromatic mark or perforation *m* nearest the numeral 5, which represents the key of the piano or organ required to produce the dominant or fifth degree of the major scale and bring the hands together until the key of the instrument thus represented is nearest the numeral 1, which represents the tonic or first degree, when the pin will strike against the body or supporting-piece, thus stopping the wheel at the right place to show the signature of the next progressive transposition by fifths. Beginning with the key of C, which has neither sharps nor flats in the signature, and turning the signature-wheel, as directed, one sharp will appear in the signature, denoting the key of G, repeating and continuing the process will show, succesively, two sharps, key of D, three sharps A, four E, five B, (six sharps F♯ or six flats G♭, the two keys being enharmoniacally the same,) five flats D♭, four A♭, three E♭, two B♭, one F, when the next transposition will show the signature of C, as shown at the beginning. Likewise using the chromatic mark near the lower fifth, known as the "subdominant" or fourth degree, which will be found near the numeral 4, and proceeding, as before, the process will be reversed, the flats increasing in the signature and the sharps diminishing, twelve such progressive transpositions always returning to a key corresponding with the signature where the start was made.

Having fully described my invention, what I claim as new, and desire to secure by Letters Patent, is—

1. In a mechanical music-chart, the combination with a body or supporting piece having a sight-opening, of a signature-wheel showing cog-like projections, substantially as described.

2. In a mechanical music-chart, the combination with a body or supporting-piece having one or more sight-openings, and having thereon characters representing musical tones, of a signature-wheel having thereon a representation of one or more octaves of the keyboard of a piano or organ, the wheel revolving on an axis consisting of one or more strings or ribbons, substantially as described.

3. In a mechanical music-chart, the combination with a body or supporting-piece having one or more sight-openings and having thereon characters or syllables representing the diatonic scale or scales, of a wheel having thereon signatures or marks of transposition and a representation of one or more octaves of the keyboard of a piano or organ, substantially as described.

4. In a mechanical music-chart, the combination with a body or supporting-piece having one or more sight-openings and having thereon characters or syllables representing the diatonic scale or scales, and a double indicator, of a wheel having thereon a representation of one or more octaves of the keyboard of a piano or organ, substantially as described.

5. The combination with a piano, organ or similar instrument, and two staple or hook shaped pieces connected with a string, of a transposer or sliding piece having thereon characters or syllables representing the diatonic scale or scales, the transposer being movably suspended from said string above the keyboard of the piano or organ and registering therewith, substantially as described.

6. The combination with the keyboard of a piano, organ, or similar instrument, of a transposer or sliding piece, and a signature-wheel, the transposer having a sight-opening and having thereon characters representing the diatonic scale, and the signature-wheel having cog-like projections to engage the black or raised keys of the piano or organ, the signature-wheel having thereon signatures or marks of transposition, the device being supported with hooks and pulleys, substantially as described.

7. The combination with the keyboard of a piano, organ or similar instrument, of a transposer or sliding piece, and a signature-wheel, the transposer having a sight-opening and having thereon characters or syllables representing the diatonic scale, a double indicator, and groups of characters representing chords, and the signature-wheel having cog-like projections to engage the black or raised keys of the instrument and having thereon signatures or marks of transposition and a series of marks chromatically arranged, the device being held in position with strings and hooks, substantially as described.

Signed at Chicago, Illinois, this 22d day of June, 1903.

SAMUEL B. TURNER.

Witnesses:
L. T. SCHAEFER,
MARY E. RYAN.